(12) United States Patent
Vu

(10) Patent No.: US 7,918,315 B2
(45) Date of Patent: Apr. 5, 2011

(54) DIFFERENTIAL TRANSMISSION WITH CLEANING FEATURE

(75) Inventor: Thomas Hung Vu, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 11/970,569

(22) Filed: Jan. 8, 2008

(65) Prior Publication Data

US 2009/0173579 A1     Jul. 9, 2009

(51) Int. Cl.
*F16H 57/04* (2010.01)

(52) U.S. Cl. ........ 184/6.12; 184/6.28; 184/6.4; 184/7.4; 474/86; 474/88; 474/160; 474/230; 474/234; 137/110; 137/115.07; 192/85.31; 192/85.38; 192/85.44; 192/106 F; 192/109 R

(58) Field of Classification Search ................. 184/6.12; 192/113.35; 475/85–93; 137/455, 456, 110–112
See application file for complete search history.

(56) References Cited

U.S. PATENT DOCUMENTS

| | | | |
|---|---|---|---|
| 2,991,664 A | | 10/1957 | Bernotas |
| 3,314,495 A | * | 4/1967 | Clark et al. .................. 180/423 |
| 3,677,381 A | * | 7/1972 | Takagi et al. .............. 192/106 F |
| 3,894,446 A | * | 7/1975 | Snoy et al. ...................... 475/88 |
| 4,412,459 A | | 11/1983 | Goscenski, Jr. |
| 4,972,762 A | | 11/1990 | Kubik |
| 5,735,764 A | * | 4/1998 | Shaffer et al. ................... 475/88 |
| 6,206,163 B1 | * | 3/2001 | Schneider ............... 192/113.35 |
| 6,397,590 B1 | | 6/2002 | Hart |
| 6,413,182 B1 | * | 7/2002 | Yates, III et al. ............... 475/86 |
| 2007/0068763 A1 | * | 3/2007 | Park ......................... 192/85 AA |

FOREIGN PATENT DOCUMENTS

| | | |
|---|---|---|
| EP | 1739328 | 1/2007 |
| JP | 5-170002 | 7/1993 |

OTHER PUBLICATIONS

European Search Report, May 4, 2009, 9 Pages.

* cited by examiner

*Primary Examiner* — Robert A Siconolfi
*Assistant Examiner* — San Aung

(57) ABSTRACT

A limited slip differential transmission of the closed type in which a pressurized lubricant is fed to the rotating gears and a series of limited slip clutch plates. The clutch plates are engaged by pressurized control fluid. A valve assembly having a spool valve is responsive to engagement pressure to permit discharge of a portion of pressurized fluid from the clutch plates to a sump chamber and the transmission to purge debris that may have accumulated in the clutch plates. The spool valve is arranged so that fluid is passed only during an intermediate movement of the valve to minimize any pressure loss from the lubricating fluid for the transmission and limited slip clutches.

9 Claims, 5 Drawing Sheets

DIFFERENTIAL TRANSMISSION WITH CLEANING FEATURE

FIELD OF THE INVENTION

The invention relates to a transmission assembly, and more specifically a differential transmission assembly.

BACKGROUND OF THE INVENTION

Differential transmissions have been in existence since the early 1930's, particularly with a limited slip feature that enables transfer of applied torque from a wheel that is slipping to a wheel that has traction. Transmissions of this type have a carrier that receives input from a pinion gear and provides a drive for planet gears meshing with sun gears attached to shafts connected to wheels on opposite sides of a vehicle. The limited slip feature involves retarding the pure differential movement of the shafts to the different wheels.

In the past, such transmissions have been lubricated by what is known as a splash lubrication system. In this system, the lower half of the assembly is bathed in lubricant so that the motion of the gears propels the lubricant up into the gear assemblies to provide lubrication. This particular type of lubrication, while simple, has a deficiency in that it generates parasitic losses because of the resistance of the movement of the gears through the lubricant. In addition, centrifugal force may cause the lubricant to be propelled away from the surfaces to be journaled and provide a potential failure mode.

In an attempt to eliminate problems of this type, so-called dry sump transmissions have been employed in which lubricant is pressurized and fed to sealed journals and other components for the rotating parts. The sealed arrangement causes the pressurized lubricant to be passed through bearing surfaces and through a normal leakage path to a sump where the lubricant is re-pressurized for delivery to the journaling surfaces.

When a limited slip feature is employed in such a transmission, it is usually in the form of a series of clutch surfaces alternately connected to a case for the differential and to one of the output shafts. The case comprises a housing and a carrier. In a differential having a closed system, the chamber for such plates forms a pocket for lubricant. As such, any debris generated by engagement and disengagement of the clutches tends to collect in the pocket, thereby having an adverse impact on the long term durability of the transmission.

What is needed therefore in the art is a transmission of the above type that provides a purging of material in the above situation.

SUMMARY OF THE INVENTION

The invention, in one form includes apparatus for purging contaminants from lubricant pockets of a limited slip differential transmission having a sealed, pressurized system for rotating and inter-engaging parts of the transmission. The apparatus is a valve element displaceable between a first and second position in response to a control feature of said transmission. Passages are formed in the transmission between the lubricant pockets and a sump for said transmission. The valve element is interposed in the passages and configured to permit flow from said lubricant pocket to said sump as said valve element displaces between said first and second position.

In another form the invention includes a transmission differential having a case journaled for rotation about a main axis. The case comprises a housing and a carrier. First and second rotatable output shafts are received by the case and journaled about said main axis and have first and second bevel sun gears affixed thereto, respectively. A plurality of bevel planet gears, are each rotatably mounted on the case in meshing engagement with the first and second bevel sun gears. A device is provided for selectively engaging said case and one of said sun gears for limiting differential action. A system is provided for supplying pressurized lubricant to journal the case, gears and the selectively engageable device, the transmission being arranged to seal the case, gears and selectively engageable device. The transmission has a passage from the selectively engageable device to the sump. A valve element is interposed in the passage and displaceable between a first and second position in response to engagement and disengagement of the selectively engageable device. The valve element is configured to permit flow of pressurized lubricant from the selectively engageable device to the sump as said valve element is displaceable between said first and second positions to purge contaminants from the selectively engageable device.

DETAILED DESCRIPTION OF THE INVENTION

Figure 1:
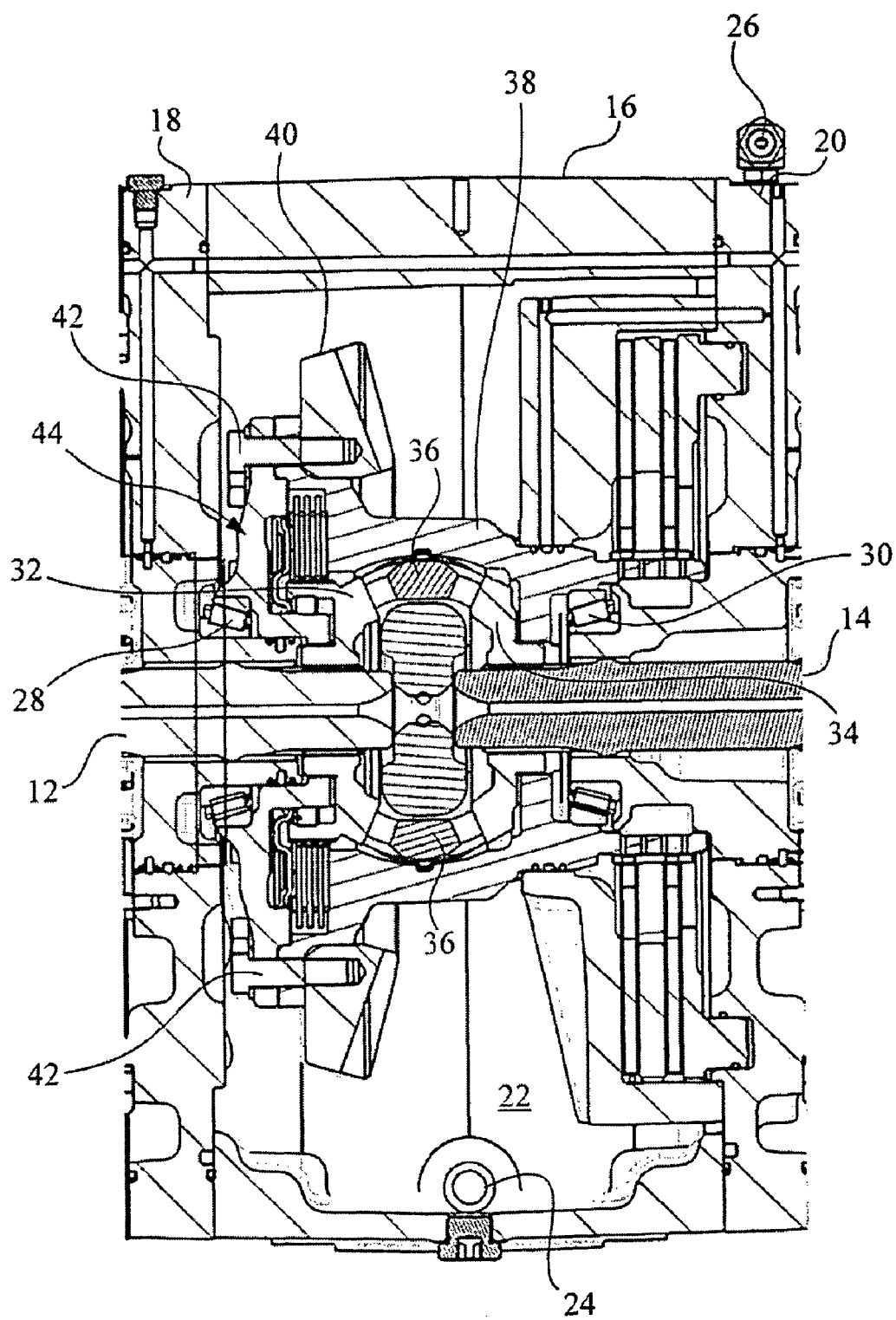
FIG. 1 is a cross-sectional view of a limited slip differential transmission with which the present invention is used.

FIG. 1 shows a differential transmission 10 used to transfer the torque output of a pinion gear (not shown) to a pair of output shafts 12 and 14. Transmission 10 has a central housing 16 and a pair of end plates 18 and 20 forming part of a housing for the transmission 10. Additional transmission features such as speed reduction, brakes, etc. are not shown to simplify the discussion of the present invention. As described later, the transmission 10 has a closed system for lubricating the rotating and inter-engaging parts and the lubricant passing through the various components flows by gravity to a sump chamber 22 for collection through appropriate filters via outlet 24 to a pump (not shown) that provides pressurized lubricant to a lubricant path through inlet 26.

A carrier 38 is journaled by means of bearing assemblies 28 and 30 respectively. A pair of shafts 12 and 14 have secured to their ends bevel sun gears 32 and 34, respectively. Sun gears 32 and 34 intermesh with a plurality of bevel planet gears 36 journaled for rotation on the carrier 38. Carrier 38 provides a mounting for a pinion gear 40 that meshes with the pinion gear (not shown) by means of appropriate fasteners 42 that extend through housing 37, also connected to carrier 38. The housing 37 and the carrier 38 cooperate to form a case 39. The carrier 38, planet gears 36, and sun gears 32 and 34 provide a differential rotation so that the shafts 12 and 14 may rotate at different RPMs when a vehicle in which the transmission 10 is mounted navigates a corner.

When the transmission 10 is installed in an agricultural or off-road industrial vehicle, there are frequently times when traction on one or more of the wheels powered by shafts 12 and 14 is reduced which causes a normal differential to send all the power to the wheel that has the greatest velocity. In order to minimize this condition, a limited slip differential assembly 44 is employed.

Figure 2:
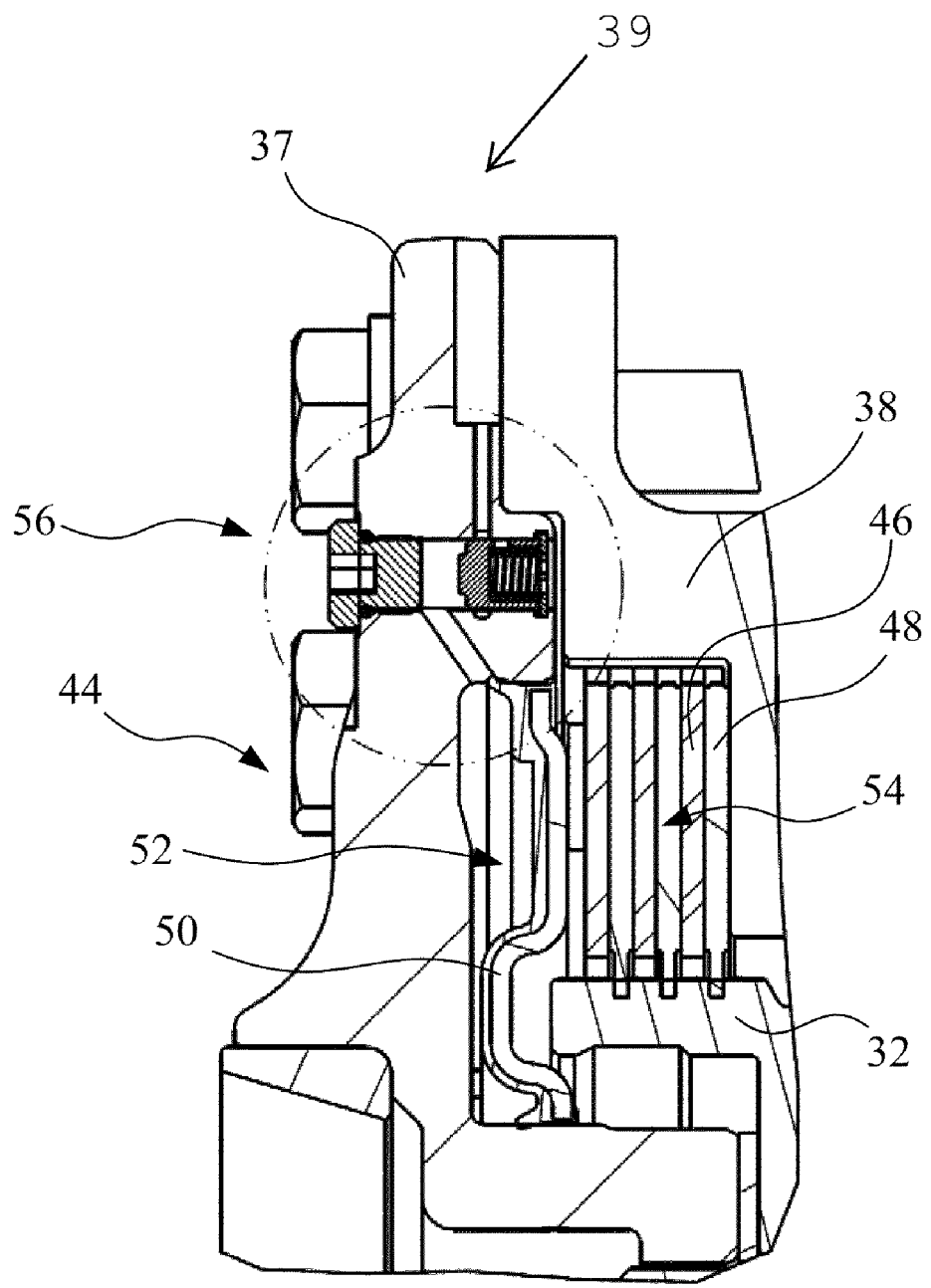
FIG. 2 is an enlarged partial section view of the control system for the present invention.

Limited slip differential assembly is shown in greater detail in FIG. 2 in which a series of disks 46 and 48 are interdigitated and respectively fixed to the carrier 38 and the one of the sun gears 32. The plates 46 and 48 are normally held in a position where they slide relative to one another except when an operational situation requires that a limited slip condition be induced. A metal diaphragm 50 is displaced against the pack of disks 46 and 48 to cause them to reduce relative rotation between carrier 38 and sun gear 32 to thereby minimize the differential action. Annular diaphragm 50 may be actuated by any one of a number means but as herein shown it is actuated by pressure within chamber 52 to urge the diaphragm 50 to the right as shown in FIG. 2 to engage the disks 46 and 48. As indicated previously the transmission 10 is of the closed type where pressure to the bearings 28, 30, gears 32, 34, and 36 and disks 46 and 48 is supplied through inlet 26 to provide a constant emersion and lubricant to enable journaling and to remove heat from the gears meshing and the friction caused by operation under load. While the bearings 28 and 30 and other elements in the transmission 10 have a flow of lubricant to the sump 22, the disks 46 and 48 are in a pocket 54 from which there is no natural flow of lubricant, particularly at the outer periphery thereof.

In accordance with the present invention, a system for purging the chamber 54 from the lubricant is indicated generally at reference character 56. The system indicated at 56 is shown particularly in FIGS. 3, 4 and 5. The system 56 includes a radially outward passage 58 in housing 37 connected to an annular groove 60 and an annular passage 62 to the outer periphery of chamber 54. A spool valve 64 is displaceable in a bore 65 that intersects annular groove 60 and annular passage 62. Spool valve 64 is retained within the bore 65 by an appropriate cap screw 66 threaded into housing 37 and sealed by means of o-ring 68. Spool valve 64 has an interior recess 70 receiving a spring 72 that urges valve assembly against cap screw 66. An appropriate retaining element 74 is positioned in bore 64 to provide an abutment for spring 72. Valve element 64 has an opening 76. When the valve 64 is in an intermediate position (see FIG. 3), the opening 76 registers with groove 60. This positioning allows the lubricant to flow from passage 62, through interior 70 of the valve 64, through grooves 60, and through outward passage 58. This position is shown in detail in FIG. 4 showing the establishment of the flow path to the exterior.

The valve element 64 is displaced to the intermediate and second positions as the result of pressure acting on the end 78 of spool valve 64. This pressure is transmitted to the end 78 of spool valve 64 by a passage 80 connected to chamber 52 providing the actuation for the disks 46 and 48 to minimize relative slippage. Although it is illustrated as having hydraulic pressure to actuate the disk pack and therefore the movement of the valve to permit flow of pressurized fluid. It should be apparent to those skilled in the art that other forms of actuation may be employed with equal results.

Figure 3:
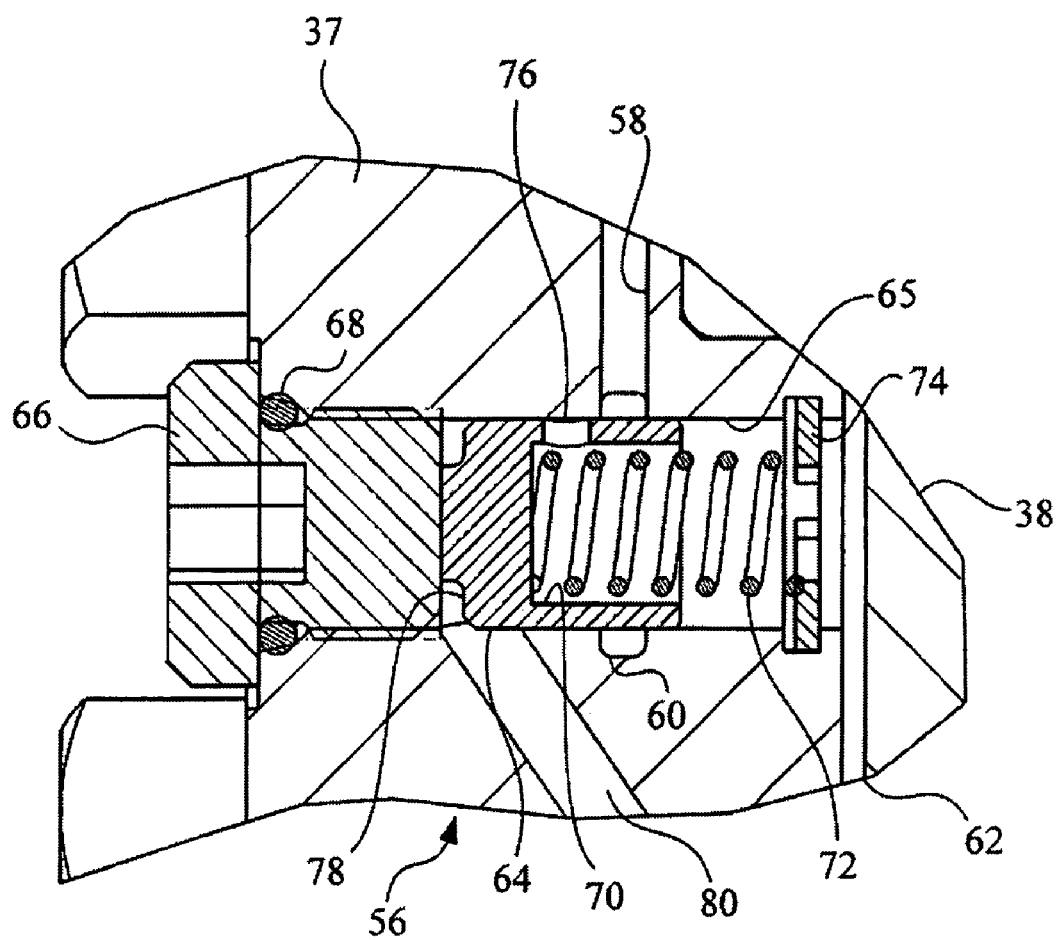
FIG. 3 is an even larger cross-section view of the valve assembly shown in FIG. 2 in various stages of actuation.
Figure 4:
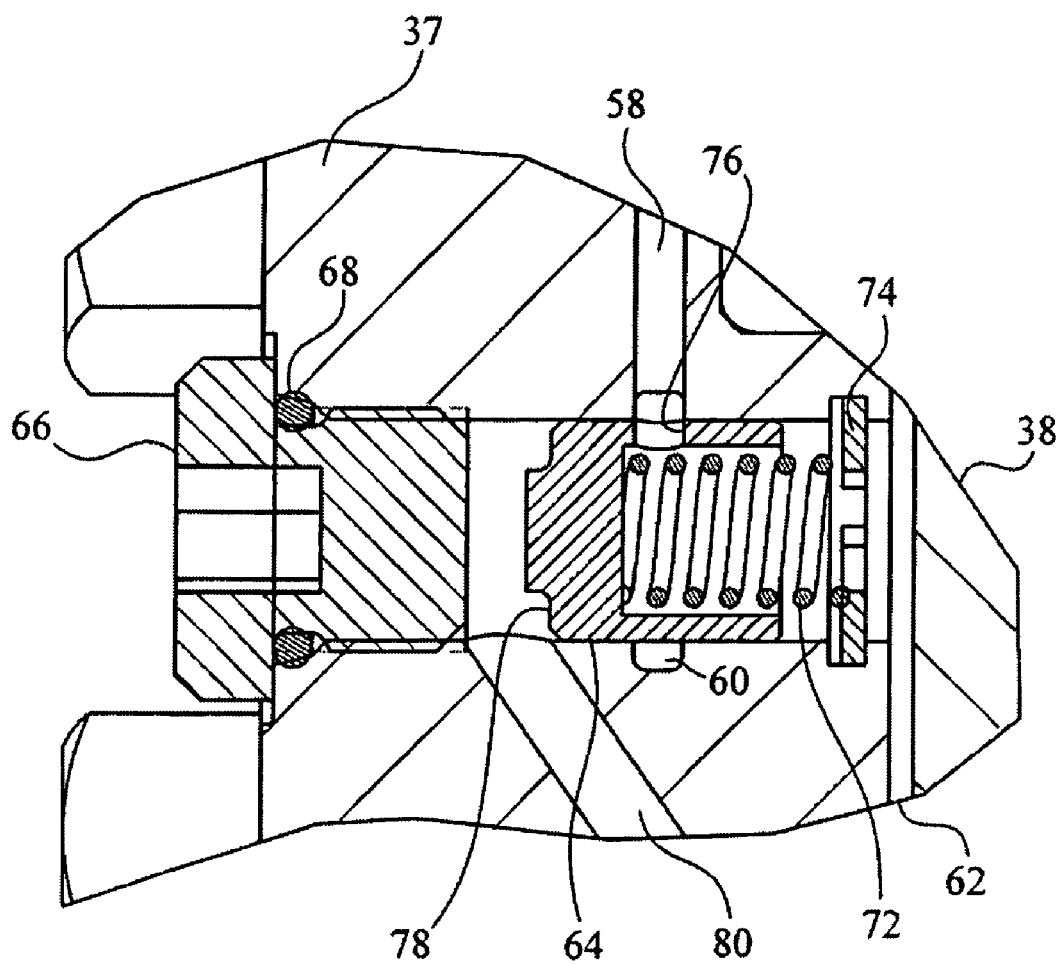
FIG. 4 is an even larger cross-section view of the valve assembly shown in FIG. 2 in an intermediate position.
Figure 5:
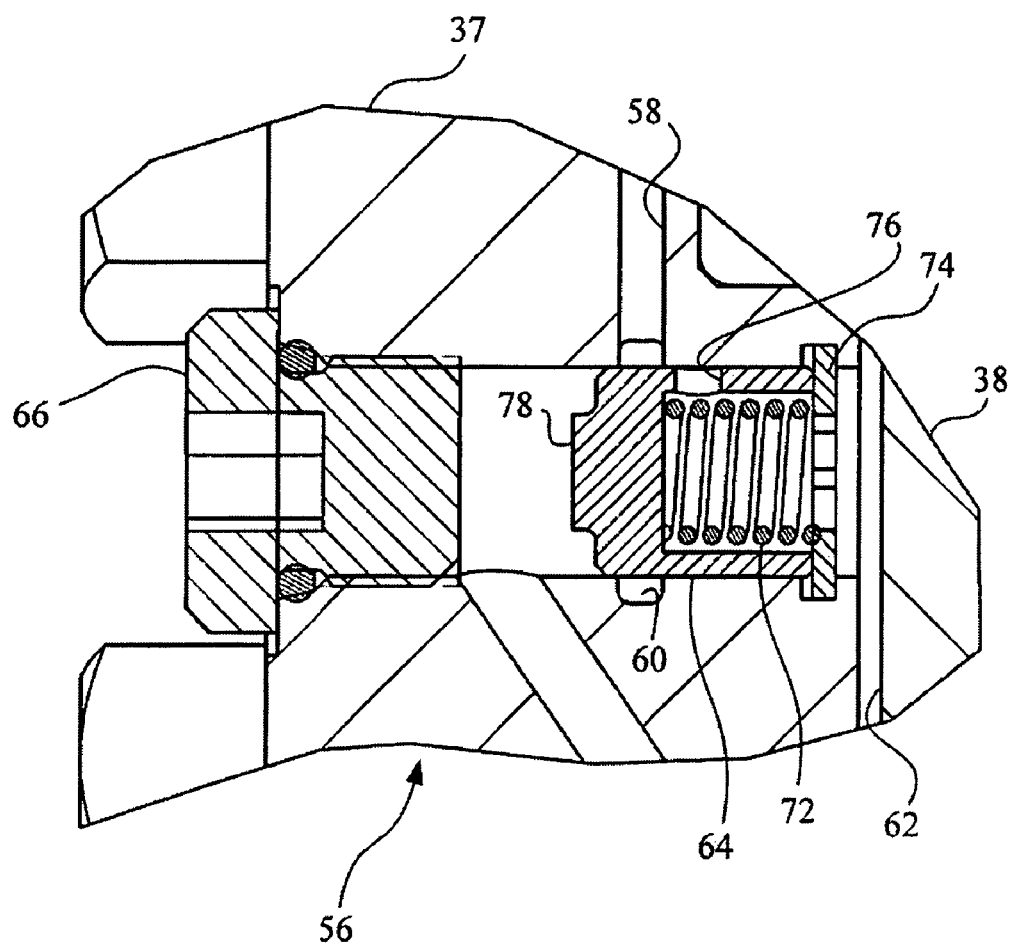
FIG. 5 is an even larger cross-section view of the valve assembly shown in FIG. 2 in a second position.

In operation, the transmission 10 operates as a pure differential transmission in which case the clutch plates 46 and 48 are slipping relative to one another and the valve element is in the first position as illustrated in FIG. 3. Through appropriate control mechanisms, pressure is applied to chamber 52 to move annular diaphragm 52 to engage clutches 46 and 48 to limit the slippage of the differential. When this occurs, the pressure in passage 80 applies across the end of face 78 urging valve element 64 to the second position as illustrated in FIG. 5. During the transition between the first and second positions, the valve element 64 causes opening 76 to align with groove 60 thus permitting a flow of pressurized fluid radially outward through passage 58 and finally to the sump 22. This permits any accumulated debris entrapped in the radially outward outer portions of chamber 54 to be purged and appropriately filtered to remove contaminants. Because the valve aligns the passages only at an intermediate position, the loss of pressure due to this action is greatly minimized so that appropriate pressure for lubrication and cooling is maintained at all times in the transmission. In addition, since the passage for contaminants is on the part 37 that rotates, centrifugal force assists in the removal from chamber 54.

Having described the preferred embodiment, it will become apparent that various modifications can be made without departing from the scope of the invention as defined in the accompanying claims.

The invention claimed is:

1. A limited slip differential, comprising:
a case journaled for rotation about a main axis;
first and second rotatable output shafts received by said case and journaled about said main axis and having first and second bevel sun gears affixed thereto, respectively;
a plurality of bevel planet gears, each rotatably mounted on said case in meshing engagement with said first and second bevel sun gears;
a selectively engageable device between said case and one of said sun gears for limiting differential action;
a system for supplying a pressurized lubricant to said case, said gears and said selectively engageable device;
a sump chamber for receiving lubricant from said case and gears;
a passage from said selectively engageable device to said sump; and
a valve element positioned fluidly between said lubricant pocket and said sump; wherein valve element is displaceable between a first position, an intermediate position, and a second position in response to engagement and disengagement of said selectively engageable device; said valve element is biased towards said first position; said valve element is configured to permit flow of a lubricant from said lubricant pocket to said sump when valve element is in said intermediate position; and said valve element is configured to prevent flow of a lubricant from said lubricant pocket to said sump when valve element is in said first and second positions.

2. The limited slip differential as claimed in claim 1, wherein said valve element comprises a spool valve displaceable between said first and second position.

3. The limited slip differential as claimed in claim 2, wherein said spool valve is yieldably urged to one of said two positions.

4. The limited slip differential as claimed in claim 1, wherein said selectively engageable device is pressure activated, said spool valve is urged to one of said positions by a spring and said pressure acts on said spool valve against the action of said spring.

5. The limited slip differential as claimed in claim 1, wherein said passage and said spool valve are positioned on said case whereby centrifugal forces assist in the purging of lubricant from said selectively engageable device.

6. The limited slip differential as claimed in claim 5, wherein said selectively engageable device comprises a plurality of clutches selectively inter-connected with said case and one of said output shafts, said clutches being bathed in pressurized lubricant.

7. The limited slip differential as claimed in claim 6, wherein said clutches are fluid pressure activated to engage and said valve is responsive to said activation pressure.

8. The limited slip differential as claimed in claim 7, wherein said valve element is hollow and has a port connecting said passage from said clutches to said sump when said valve is in an intermediate position but not in said first and second positions.

9. The limited slip differential as claimed in claim 8, wherein said valve element is spring loaded to one of said positions and is responsive to pressure to be displaced to the other of said positions.

* * * * *